United States Patent [19]

Hanke et al.

[11] 4,268,382
[45] May 19, 1981

[54] SIEVE AND SIEVING APPARATUS FOR SEPARATING SOLIDS FROM A SUSPENSION

[75] Inventors: Reinhard Hanke, Leoben; Kornel Jahn, Vienna, both of Austria

[73] Assignee: Voest-Alpine Aktiengesellschaft, Linz, Austria

[21] Appl. No.: 89,241

[22] Filed: Oct. 29, 1979

[30] Foreign Application Priority Data

Nov. 7, 1978 [AT] Austria ................................ 7942/78

[51] Int. Cl.³ .............................................. B07B 1/04
[52] U.S. Cl. .................................... 209/273; 209/354; 209/393; 210/499
[58] Field of Search ................ 209/274, 281, 393–395, 209/268, 269, 314, 352, 354; 210/433, 499; 162/374, 352

[56] References Cited

U.S. PATENT DOCUMENTS

| 651,725 | 6/1900 | Ruble | 209/393 |
|---|---|---|---|
| 2,183,157 | 12/1939 | Swedman | 209/393 X |
| 2,883,051 | 4/1959 | Maeder | 209/269 |
| 3,713,610 | 1/1973 | Grenier | 162/374 X |
| 3,815,740 | 6/1974 | Ginaven | 209/281 X |
| 3,880,711 | 4/1975 | Hayes | 162/352 X |
| 4,113,626 | 9/1978 | Detcher | 209/281 X |
| 4,193,503 | 3/1980 | Connolly | 209/393 |

FOREIGN PATENT DOCUMENTS

| 1017840 | 10/1957 | Fed. Rep. of Germany | 209/393 |
| 1102336 | 5/1955 | France | 209/393 |

Primary Examiner—Robert Halper
Attorney, Agent, or Firm—Kurt Kelman

[57] ABSTRACT

A plurality of parallel sieve bars are transversely spaced apart in a plane to form a sieve. Each sieve bar has a side face enclosing an angle with the plane and diverging therefrom in the same direction so that the side faces constitute a stepped surface on said one side of said sieve. In sieving apparatus, such a sieve is arranged with said sieve bars spaced apart in an inclined plane and all side faces are disposed on the upwardly facing side of the sieve so that the angles of inclination of the side faces decrease progressively in groups of bars or from bar to bar.

4 Claims, 2 Drawing Figures

U.S. Patent May 19, 1981 4,268,382
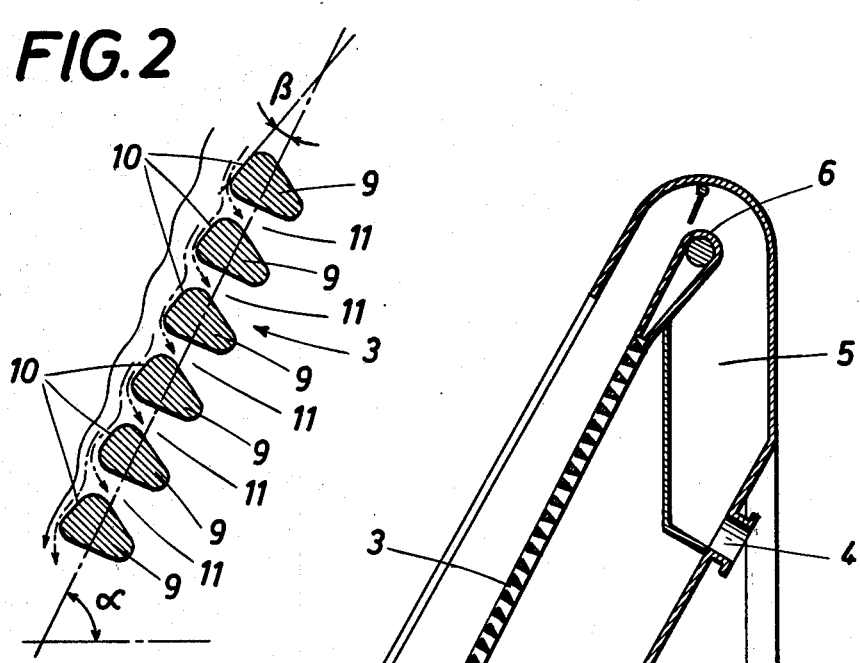
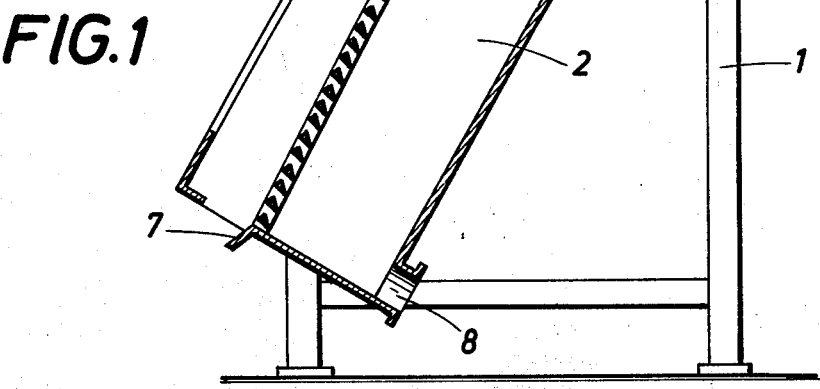

SIEVE AND SIEVING APPARATUS FOR SEPARATING SOLIDS FROM A SUSPENSION

This invention relates to a sieve for separating solids from a suspension comprising sieve bars which extend transversely to the direction in which the sieve is inclined and define sieve gaps between them and are preferably substantially triangular in cross-section. Each sieve bar has a side face forming the upper surface of the sieve.

When a suspension consisting of water and solids is moved over such a sieve, the layer formed by the suspension moving along the sieve decreases in thickness from each sieve gap to the next because a thin layer of water is withdrawn through each sieve gap. In order to ensure an efficient separation of solids from the suspension, the layer of water withdrawn through each gap should be minimized so that large solid particles cannot be entrained by said layer of water. Besides, the solids within the suspension layer should be raised from the upper surface of the sieve so that an entraining of solids by the water layers being withdrawn will be prevented.

These requirements cannot be satisfactorily met by the known sieves of the kind described first hereinbefore. Because the side faces of the sieve bars are substantially flat, the solids in the suspension cannot be subjected to forces tending to raise them from the flat upper surface of the sieve but those solids which are contained in the suspension and disposed near the upper surface of the sieve will be moved into the sieve gaps together with the water layer which is being withdrawn. In an attempt to avoid these disadvantages, a proposal disclosed in British Patent Specification No. 1,255,851 has been made to provide the sieve bars with side faces which form the upper surface of the sieve and which are trough-shaped rather than flat so that that cambered edge portion of the trough which protrudes opposite to the direction of flow toward the preceding sieve bar imparts to the solids a component of movement whereby they are raised from the upper surface of the sieve and can virtually jump over the sieve gap. On the other hand, the adjacent trough edge portion of the adjacent sieve bar has an equal and opposite configuration so that part of the liquid stream is urged into the sieve gap. Water is withdrawn from the suspension at a relatively high rate through each gap and will necessarily entrain a corresponding proportion of solids although this is not desired. Besides, the manufacture of the specially shaped sieve bars is expensive and the impact of water on the rear edge portion of the trough will result in a heavy wear of that portion of the sieve bar.

It is an object of the invention to avoid these disadvantages and so to improve a sieve of the kind described first hereinbefore that a high efficiency of separation is achieved with simple means whereas the throughput is not decreased.

This object is accomplished according to the invention in that those side faces of the sieve bars which constitute the upper surface of the sieve have a smaller inclination from the horizontal than the sieve so that the upper surface of the sieve is stepped. Owing to the smaller inclination from the horizontal of those side faces of the sieve bars which constitute the upper surface of the sieve, said upper surface will be stepped so that it will automatically impart an upward component of movement to the solids as they move from one sieve bar to the next. An ingress of solids into the sieve gap will be opposed by the fact that owing to the steps in the upper surface of the sieve the sieve bar which succeeds the gap will be disposed sufficiently below the discharge edge of the preceding sieve bar so that the solids will be transferred to the side face of the succeeding sieve bar, which side face is part of the upper surface of the sieve, rather than to the edge of the succeeding sieve bar or to that side face thereof which defines the sieve gap. This effect will be produced although the solids are deflected toward the sieve gap to some extent. The solids will thus be reliably transferred from each sieve bar to the next because the leading edge of the succeeding sieve bar, which defines the rear side of the sieve gap, is sufficiently set back from the flowing suspension.

Because the inclination of those side faces of the sieve bars which constitute the upper surface of the sieve influences the velocity of flow of the suspension, the velocity curve of the suspension can also be controlled by the selection of that inclination. If the inclination from the horizontal of those side surfaces of the sieve bar which constitute the upper surface of the sieve is decreased in groups of bars or from sieve bar to sieve bar in the direction of flow of the suspension, the velocity of flow will decrease so that curved sieves or sieves having sections inclined at different angles may be replaced by straight sieves, which can be manufactured much more easily. On the other hand, the effect of different inclinations of different portions of the sieve can be increased if those side faces of the sieve bars which constitute the upper surface of the sieve are inclined at different angles. This results in a periodic deformation (working) of the particles so that their coagulation will be improved as well as the dewatering of the solids retained on the screen. If the sieve plates are arranged with the same inclination, the force which tends to propel the suspended particles will remain constant even if the resistance to flow increases. This will avoid the undesired deposition of the solids on the usual arcuate sieves. Besides, the length of the sieve can be selected freely as required without regard to an arcuate shape.

An embodiment of the invention is shown diagrammatically and by way of example on the drawing, in which FIG. 1 is a simplified longitudinal sectional view showing apparatus for separating solids from a suspension with a sieve according to the invention and FIG. 2 is an enlarged transverse sectional view showing the sieve bars of a sieve section.

The apparatus which is shown comprises an open housing 2 which is mounted in a frame 1 and in which a sieve 3 has been inserted. The suspension to be separated flows through an inlet 4 into a stilling chamber 5 and from the latter across an overflow edge 6 to the sieve. The solids separated from the suspension are discharged via a chute 7. The liquid can be withdrawn through an outlet pipe 8.

The sieve 3 comprises spaced apart sieve bars 9 which extend transversely to the direction in which the sieve is inclined and are substantially triangular in cross-section. The side faces 10 of the sieve bars 9 form the upper surface of the sieve and their angle of inclination from the horizontal is smaller than the sieve angle of inclination $\alpha$ from the horizontal by an angle $\beta$ so that the upper surface of the sieve is stepped, as is clearly apparent from FIG. 2. Owing to this stepped configuration, the solid particles of the suspension are transferred over the sieve gaps 11 between adjacent sieve bars and only a thin layer of liquid flows through the gaps 11. As a result, the length of the screen area in which dewatering is effected is increased whereas the throughput rate and the dewatering rate are not changed. This results in a higher efficiency of separation and in a longer useful life of the sieve because the latter is subjected to a lower wear at the set back edges of the sieve bars.

As is strictly diagrammatically indicated in FIG. 1, the angle of inclination from the horizontal of those side faces 10 of the sieve bars which constitute the upper surface of the sieve are decreased in groups which are arranged one behind the other in the direction of flow. This produces the same effect as a sieve having sieve sections inclined at different angles. A progressive decrease of the inclination of the side faces 10 from the horizontal will result in a sieve which produces the same effect as an arcuate sieve. Such sieve can be inclined more steeply for a given dewatering effect so that the risk of solids being caught in the lower portion of the sieve will be decreased.

What is claimed is:

1. A sieve having an upper feed end and a lower discharge end for separating solids from a suspension, comprising a plurality of parallel sieve bars transversely spaced apart in a plane having a constant angle of inclination, each sieve bar having an upwardly facing side face enclosing an angle with the plane, all side faces being disposed on the same side of the sieve and diverging from the plane in the same direction whereby they constitute a stepped sieve surface on said upwardly facing side of the sieve, and the angles enclosed by the side faces with the plane increasing progressively in the direction of divergence of the side faces from said feed end to said discharge end.

2. A sieve as set forth in claim 1, in which there are successive groups of sieve bars, each group having upwardly facing side faces, said side faces of each group having the same divergence from said plane, the angles between the side faces and said plane of each successive group from said feed end to said discharge end increasing in the direction of said side face divergence from said plane.

3. A sieving apparatus having an upper feed end and a lower discharge end for separating solids from a suspension, comprising a sieve disposed in one inclined plane and having a plurality of parallel sieve bars transversely spaced apart in said plane, each sieve bar having a side face enclosing an angle with the sieve plane, all side faces being disposed on an upwardly facing side of the sieve and diverging from the plane in the same direction whereby the side faces constitute a stepped sieve surface on the upwardly facing side of the sieve, and the angles enclosed by the side faces of the sieve bars with the inclined plane of the sieve, decreasing downwardly in the direction of divergence from said upper end to said lower end.

4. The sieving apparatus of claim 3, in which there are successive groups of sieve bars, each group having the same angles enclosed by said side faces, the angles enclosed by said side faces of each successive group from said feed end to said discharge end decreasing downwardly in the direction of divergence.

* * * * *